Figure 1:
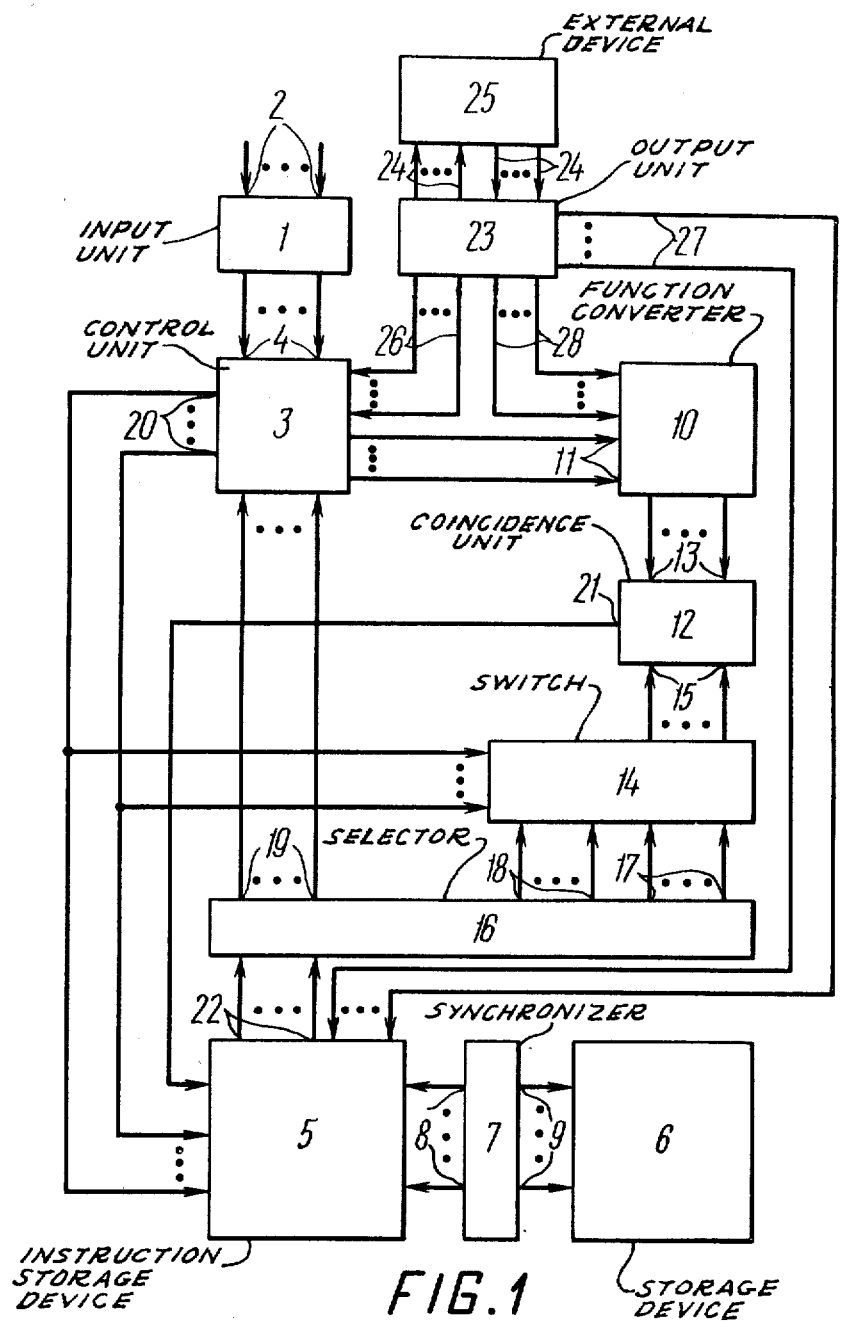

United States Patent [19]
Balashov et al.

[11] 3,974,482
[45] Aug. 10, 1976

[54] STORAGE AND DISPLAY APPARATUS

[76] Inventors: Vladimir Nikolaevich Balashov, ulitsa Druzhby, 17, kv. 2, Podolsk, Moskovskoi oblasti; Valery Timofeevich Gavich, Pleteshkovsky pereulok, 10, kv. 8; Igor Mitrofanovich Glyzdov, Chusovskaya ulitsa, 11, korpus 7, kv. 42, both of Moscow; Vladimir Semenovich Dyatlov, ulitsa Kommunisticheskaya, 12, kv. 35, Ramenskoe Moskovskoi oblasti; Verlen Nikolaevich Ermakov, Veernaya ulitsa, 3, korpus 5, kv. 265, Moscow; Jury Nikolaevich Kushelev, shosse Entuziastov, 104 V, kv. 6, Moscow; Mikhail Nikolaevich Sosenko, Nagernaya ulitsa, 23, kv. 74, Moscow, all of U.S.S.R.

[22] Filed: Aug. 22, 1974

[21] Appl. No.: 499,848

[52] U.S. Cl. ............................. 340/172.5; 35/8 R
[51] Int. Cl.² ........................................ G09B 7/08
[58] Field of Search .................... 35/8; 340/172.5

[56] References Cited
UNITED STATES PATENTS
3,832,790  9/1974  Fryer, Jr. ........................ 35/8 R FOREIGN PATENTS OR APPLICATIONS
1,537,832  7/1968  France ........................ 35/8

*Primary Examiner*—Eugene G. Botz
*Attorney, Agent, or Firm*—Haseltine, Lake & Waters

[57] ABSTRACT

Apparatus for presenting information held in locations of a storage and display device providing selection of locations along at least one selection coordinate comprises, according to the invention, an input unit, a control unit connected to the input unit, an instruction storage device connected to the control unit and including locations for holding instructions, each location of the instruction storage device corresponding to a location of the storage device and holding an instruction which is a binary number containing at least one additional address of the same location, with the number of additional location addresses equal to the number of location selection coordinates in the storage device. The apparatus comprises also a synchronizer connected with the instruction storage device and the storage device, a coincidence unit with the first inputs thereof electrically connected to the control unit, the second inputs connected to the output of the storage device, and the output of the coincidence unit connected to the instruction storage device, a selector whose inputs are connected to the outputs of the instruction storage device, and a switch the inputs of which are connected to corresponding outputs of the selector and the control inputs are coupled to the control unit.

13 Claims, 16 Drawing Figures

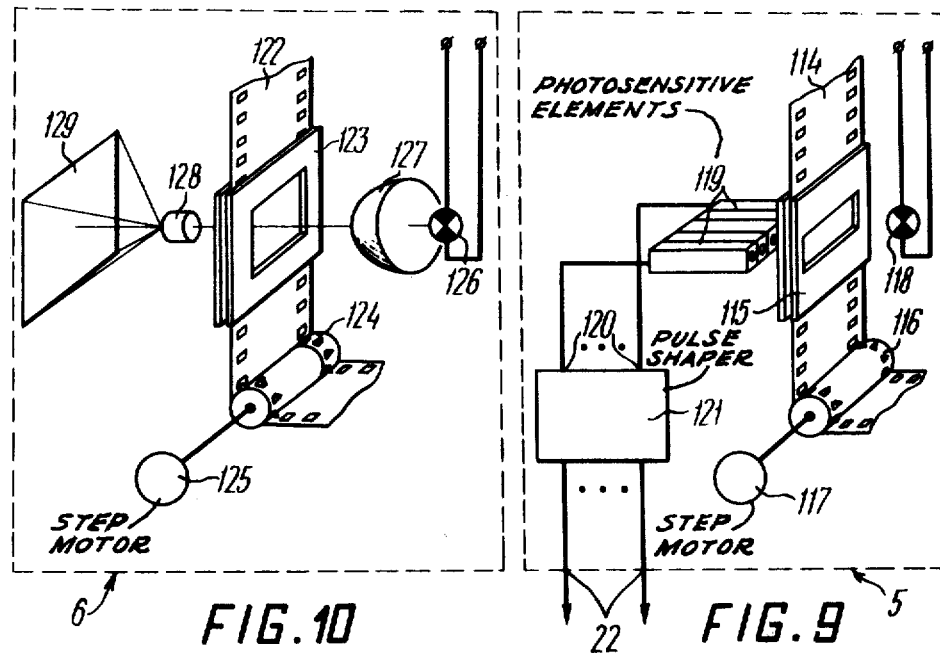
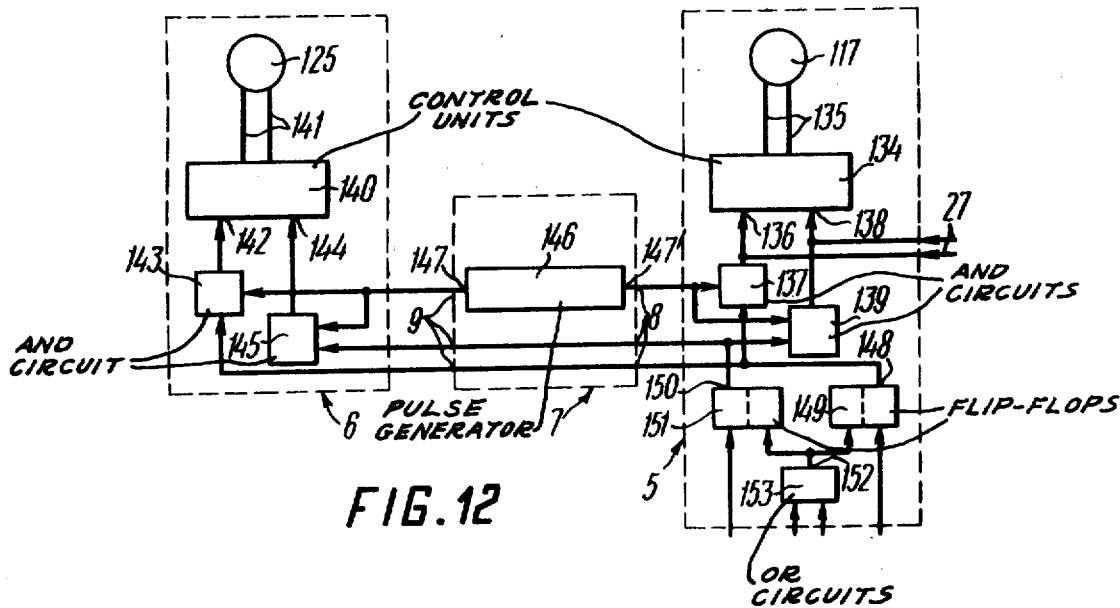

STORAGE AND DISPLAY APPARATUS

The invention relates to information retrieval systems and more particularly to apparatus for presenting information.

The invention can be used as a teaching machine, a unit for diagnosing through tests and as a general-purpose reference unit.

Apparatus for presenting information comprises a storage and display device preferably using a movie film strip with frames which store word and graphic information. The information retrieval process consists in rewinding the movie film in the storage device automatically until a frame with desired information appears in an exposure aperture of a projection system. The information of this frame is projected onto a screen for further use.

A frame containing required information is selected in response to an input instruction delivered to an input unit of the apparatus which is preferably made as a keyboard. The instruction delivered is a code of the information needed which determines the sequence of the input unit keys to be depressed.

Other known types of storage and display devices may also be used in the present apparatus, for example, a magnetic storage device the locations of which store desired information. Therefore, hereafter a frame of a movie film strip will be called also a location of a storage device.

Below is given a detailed description of storage and display devices which are predominantly used in preferred apparatus for presenting information.

One of such devices is a projector comprising a film transport mechanism the locations (frames) of which hold microfilmed word and graphic information. Each location of the storage device is assigned an address (binary number) which makes it possible to distinguish between the locations. The address of a location is usually coded in the form of a combination of black and white markings on a portion of each frame and projected onto photo-sensitive reading elements which generate output electric signals representing the address of this frame.

A storage and display device of this type using a linear information storage medium (movie film strip) will be called a storage device with one selection coordinate.

Consider now another storage device with two information selection coordinates.

In this storage and display device word and graphic information is contained in frames of a diomicrocard which is movable in two mutually perpendicular directions with the aid of a special mechanism. The information from a desired frame is projected onto a screen.

Since the frame of a diomicrocard is very small, it is not convenient to make code markings on a portion of this frame and, therefore, storage of the address of the frame in a location of another storage device (instruction storage device) operating in synchronism with the first device would be preferable. As the address of a frame is a binary number, it may be stored in any known storage device, for example, in a permanent memory unit and a magnetic-core memory unit used in computer equipment.

A known "Teaching and monitoring device" (Inventor's Certificate, USSR No. 277421 MPK G09B 0967/02) comprises two storage and display devices: one storage device on a diomicrocard with its frames holding only word and graphic information, and one, instruction storage device which stores the addresses of the frames of the diomicrocard. Operation of these two storage devices is synchronized by means of linkage.

Another known device "Apparatus for presenting information" (U.S. Pat. No. 3,218,921, class 35-8) comprises a storage and display device (film projector) using a movie film strip with a series of frames. One portion of each frame stores word and graphic information and is projected onto a screen, the remaining portion is the address of this frame which is a binary number coded in the form of dots (or absence of dots) which are projected onto a photosensitive assembly.

A part of each frame holding an information image is considered as a location of a storage device, while a part of a frame storing its address is considered as a location of an instruction storage device, the storage device comprising a film transport mechanism, a projection system and a screen, and the instruction storage device containing the same film transport mechanism, the same projection system and an assembly of photosensitive elements.

Operation of these two storage devices is synchronized by using a common information storage medium (movie film strip).

The apparatus comprises also an input unit (keyboard) intended for controlling the apparatus, and a storage and comparison unit with the first input thereof connected to the input unit and the second input connected to the photo-sensitive assembly.

The input unit is connected to one control input of the film transport mechanism of the projector which receives from the input unit a signal actuating the film transport mechanism; the output of the storage and comparison unit is coupled to the second control input of the projector film transport mechanism which accepts a stop signal from the storage and comparison unit.

The apparatus operates as follows.

The address of a frame containing required information is set up by pressing the keys of the input keyboard. The address which acts as an input signal of the apparatus is converted in the input unit into an electric signal (input instruction) to be delivered to the first input of the storage and comparison unit and stored therein. Simultaneously, the input unit generates a control signal which actuates the film transport mechanism of the projector.

The address of each frame displayed through the exposure aperture of the film transport mechanism is projected onto the photo-sensitive assembly, converted into an electric signal and delivered to the second input of the storage and comparison unit where it is compared with the address of a frame needed.

At an instant when the address of a frame displayed in the exposure aperture coincides with the address of a frame being retrieved, the storage and comparison unit produces a signal which stops the film transport mechanism. As a result, the frame comes to rest in the exposure aperture and is projected onto the screen by the projection system.

When using the apparatus for programmed teaching, the student must either be able to select frames with new material (if his answer was correct) or return back in order that the excercises may be repeated (if an incorrect answer was given).

The frames of the movie film strip contain microfilmed information which must be taught to the student and also questions for scoring student's performance.

Each question is provided with a set of possible (or alternative) answers so that the student could select the answer he considers to be correct.

If the answer selected by the student is correct, the student passes on to a frame with new educational information, if the answer is wrong, the film strip is automatically reversed for repetition of the material.

To realize such an educational process with the aid of this known apparatus, each frame storing the information to be taught must contain the address of the next frame to be selected by the student after learning the information of the previous frames. The student views this address on the screen and inserts it in the apparatus by depressing the keys of the input keyboard.

The basic drawback of the above described apparatus is that each frame with an information image has only one address at which it can be retrieved.

Let it be assumed, for example, that the program provides for retrieval of some frame in forward operation of the film strip if new educational information is desired, and in its reverse motion if the interrogation reveals that the student does not perform well enough and the material must be repeated.

For executing such a program in the known apparatus it is required that a frame be retrieved both in forward and reverse movement of the movie film strip at the only address of this frame, while all frames between this frame and the frame from which the film is reverted must have addresses other than the address of this frame.

Instructional programs usually employed at colleges and universities may contain a large number of intermediate frames disposed between a given frame and the one to which the film strip is reverted. These intermediate frames may also be retrieved both in the forward and in the reverse operation of the film. As a result, restrictions imposed on the assignment of addresses to frames of the film strip are found to be so large for complex educational programs that the known apparatus becomes inapplicable for realizing such programs.

Another drawback of the known apparatus is that it cannot change the direction of film movement depending on whether the answer selected by the student is correct or incorrect.

Still another drawback of the known apparatus is that the address of the frame which is retrieved when the student has selected his response to the interrogation depends on this response only (i.e. by the number of the key depressed on the input keyboard) and has no relation to his answers to the previous questions. Due to this drawback, the apparatus cannot take into account individual traits of the student in the course of teaching.

A further drawback of the known device is that it has no provisions for blocking the keys which are not needed for response to the interrogation displayed in a particular frame of the film strip.

Thus, for instance, if five versions of answers are possible to a posed interrogation, while the input keyboard consists of ten keys, the five keys not involved in answering the interrogation must be blocked, otherwise any occasional or purposeful depression of one of these keys by the student will display a frame inappropriate whatsoever to the program.

A still further drawback of the known device is the lack of facilities for connecting peripheral devices, for example, a teacher's console to control operation of the apparatus or a computer which also controls the apparatus according to a preset algorithm and performs statistical processing of the data obtained from the apparatus.

It is an object of the present invention to provide an apparatus for presenting information stored in storage locations which effectively retrieves a desired location both in an ascending and in the descending order of arrangement, locations which permits an arbitrary choice of the direction of location retrieval in the storage device for each unlocked key of the input keyboard and blocking of any number of these keys for each frame, which retrieves locations in the storage device at addresses determined not only by the code of the input key, but also be the code of the preceding key depressed on the input keyboard, and which provided facilities for operation of the apparatus with an external device, for example, with a computer.

This object is achieved by apparatus for presenting information stored in the locations of a storage and display device which selects locations along at least one selection coordinate, comprising: an input unit for sensing an input signal in the form of a binary number, a control unit connected to the input unit and intended for converting the binary code of the input instruction of the control unit into another binary number with some bits thereof forming an output instruction of the control unit and the remaining bits representing a control instruction for other units of the apparatus, an instruction storage device connected to the control unit which contains locations for storage of the instructions, each instruction being a binary number corresponding to at least one address of an instruction storage location, the number of addresses of the location being equal to the number of location selection coordinates in the storage device, and which selects locations in the ascending sequence of connection of these locations to the output of the instruction storage device in response to the control instruction from the control unit, each location of the instruction storage device corresponding to a location in the storage device, a synchronizer connected to the instruction storage device and the storage device which synchronizes retrieval of locations in the instruction storage device with the retrieval of appropriate locations in the storage device, a coincidence unit intended for comparison of the output instruction of the control unit which coincides with the address of at least one instruction storage location, with the address of the instruction storage location; should the addresses coincide, this coincidence unit generates a signal that stops location selection in the instruction storage device upon delivery to this device, the first inputs of the coincidence unit being electrically connected to the control unit, second inputs connected to the output of the instruction storage device, and the output of the coincidence unit being coupled with the instruction storage device, wherein, according to the invention, each location of the instruction storage device holds an instruction which is binary number comprising at least one additional address of the same location, the number of additional addresses of the locations being equal to the number of location selection coordinates in the storage device, and which also has a selector with the inputs thereof connected to the output of the instruction storage device intended for discriminating the addresses of each location of the instruction storage device, the addresses being delivered to appropriate outputs of the selector, a switch to alternately connect the addresses of a location of the instruction storage device to second inputs of the coincidence unit as determined by the control instruction of the control unit, the inputs of the switch being connected to corresponding outputs of the selector and the control inputs of the switch being connected to the control unit, the sequence of location selection in the instruction storage device also depending on the control instruction delivered from the control unit.

Preferably, a location of the instruction storage device holds an instruction which is a binary number containing a control code and a reversal code intended for converting the input instruction of control unit and generating a control instruction of the control unit, the selector having at least one additional output connected to the control unit.

Preferably, AND and OR circuits are provided in the control unit of the apparatus for presenting information arranged so that each input bus of the control unit representing one bit of the control unit input instruction is connected to the common point of the first inputs of two appropriate AND circuits, the second inputs of these AND circuits are connected to other input buses of the control unit associated with one bit of the control coda and one bit of the reversal code, the output of one AND circuit is connected to the input of the first OR circuit or the input of the second AND circuit, the output of the second AND circuit is connected to another input of the second OR circuit, and the input of a third AND circuit, the number of the first AND circuits and the number of the inputs of the second and third OR circuits being equal to the number of bits in the input instruction of the control unit, the outputs of the first OR circuits form the output buses of the control unit, each corresponding to one bit of the output instruction of the control unit, and the outputs of the second and third OR circuits form the output buses of the control unit representing bits of the control instruction of the control unit.

It will be appreciated that the control unit compreses additional AND circuits, the number thereof being equal to the number of bits in the input instruction, a first input of each additional AND circuit is connected to an output of one AND circuit, and a second input of the additional AND circuit connected to and output of another AND circuit, and the outputs of the additional AND circuits are interconnected to form an output bus of the control unit representing an additional bit of the control instruction of the control unit.

It will also be appreciated that the apparatus for presenting information comprises a function converter having inputs thereof receiving an output instruction of the control unit, intended for converting this instruction into a code coinciding with the address of one location of the storage device, and that the outputs of the function converter are connected to first inputs of the coincidence unit, while the inputs are coupled to the control unit.

It is desirable that in the apparatus for presenting information a function converter comprises a matrix converter with the inputs thereof connected to the control unit which serves for linear conversion of the input instruction applied from the control unit, an adder having its first input connected to the outputs of the matrix converter, a delay unit connected to the adder outputs and used for storing an instruction applied from the adder outputs, a second matrix converter with the inputs thereof connected to the outputs of the delay unit and the outputs connected to second inputs of the adder, which is intended for linear conversion of the instruction stored in the delay unit, while the adder outputs are connected to the first inputs of the coincidence unit.

It is also desirable that the apparatus for presenting information comprises an output unit for an exchange of instructions between the control unit and the external device which is connected to the control unit and the external device.

Preferably, in the apparatus for presenting information a control unit intended for an exchange of instructions between the external device and the instruction storage device is connected to the instruction storage device.

It is also preferable that in the apparatus for presenting information the output unit intended for an exchange of instructions between the function converter and the external device is connected to the function converter.

The apparatus for presenting information of the present invention helps solve all problems of a methodological nature involved in programmed teaching which are usually handled by complex teaching systems based on large-capacity computers.

The apparatus of the present invention is simple in design and is able to operate as a separate machine where application of complex teaching systems is not feasible.

The apparatus for presenting information can also be employed for an automatic diagnosis on the basis of diagnostic tests, as an automatic inquiry station for railway stations, exhibitions and libraries and for a number of similar applications.

This is achieved by merely replacing one information carrier by another, for example, a test.

The reason for such an extensive range of application of the apparatus is that the algorithms for solving the above problems are identical with the algorithm of its operation as a teaching device.

Figure 2:
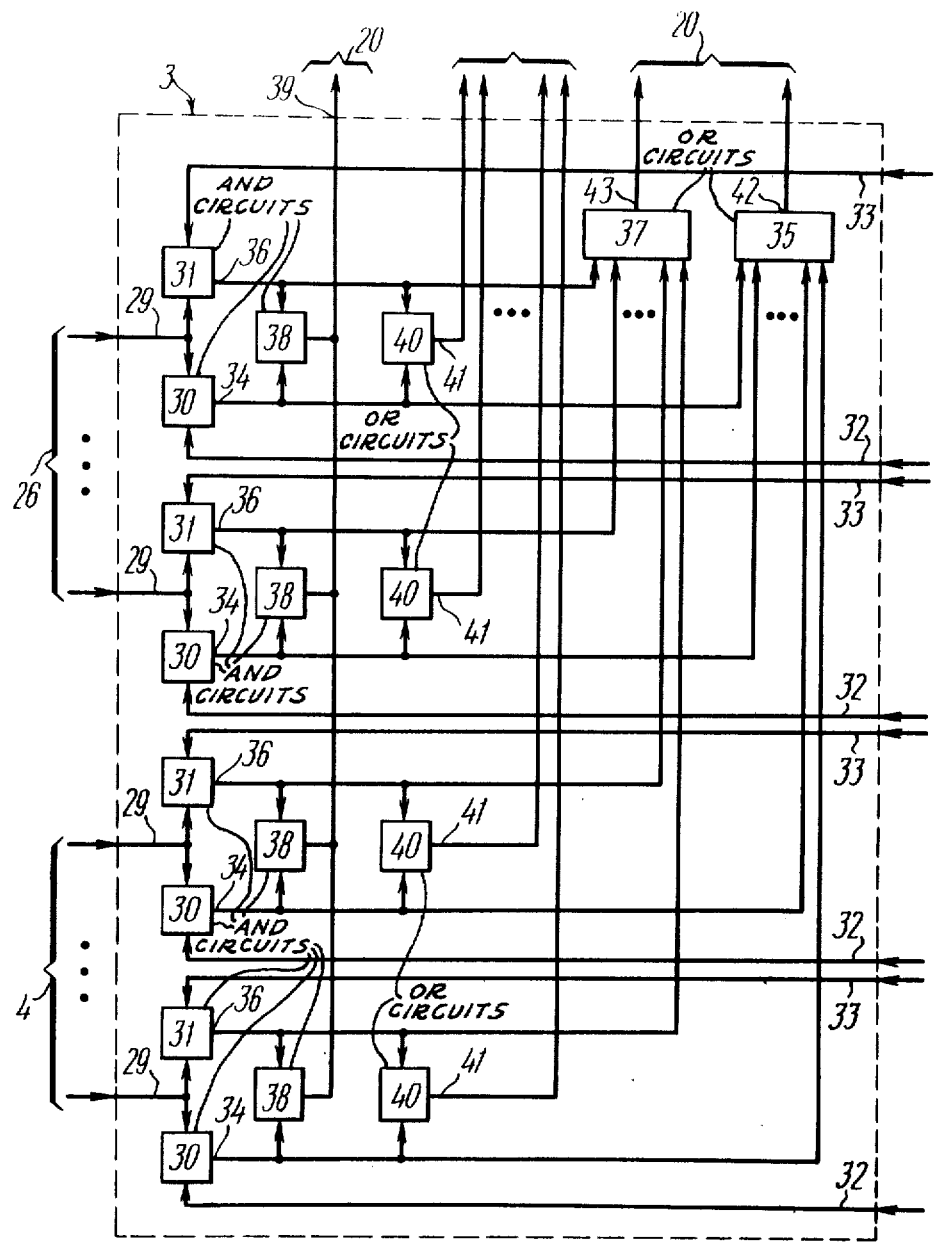
Figure 3:
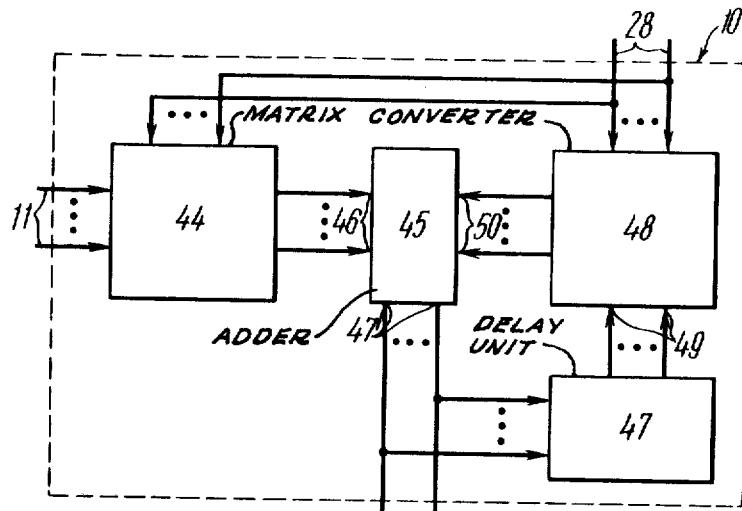
Figure 11:
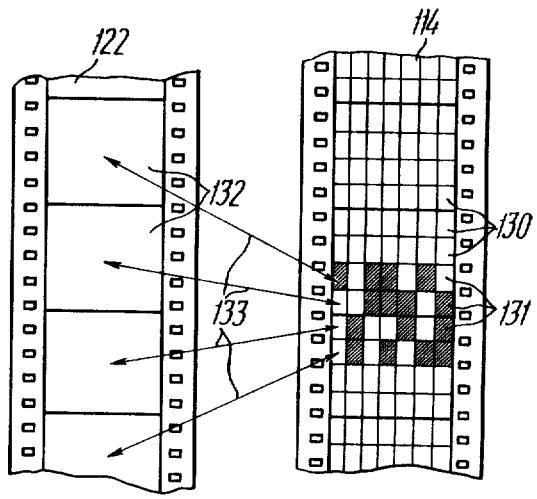
Figure 4:
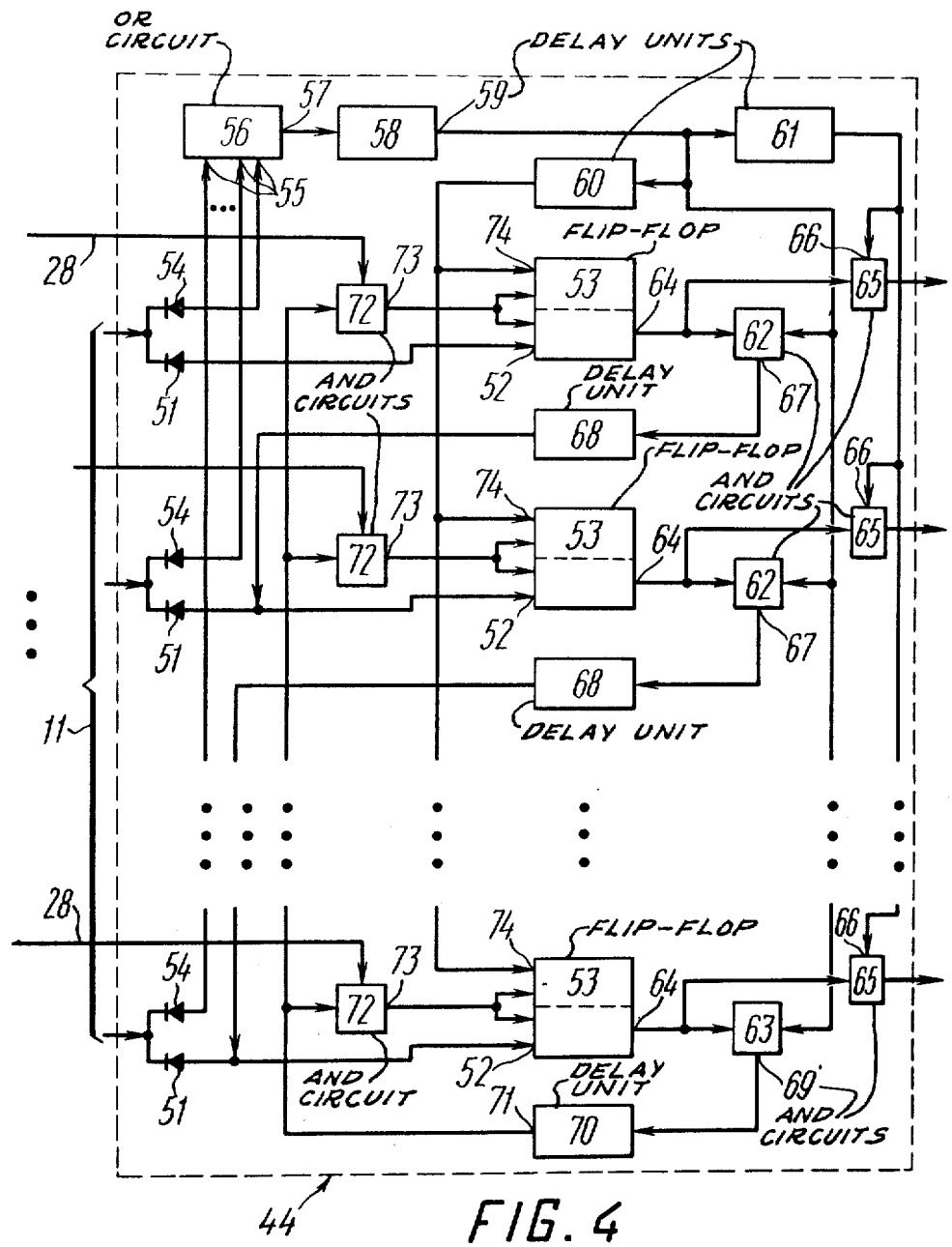
Figure 5:
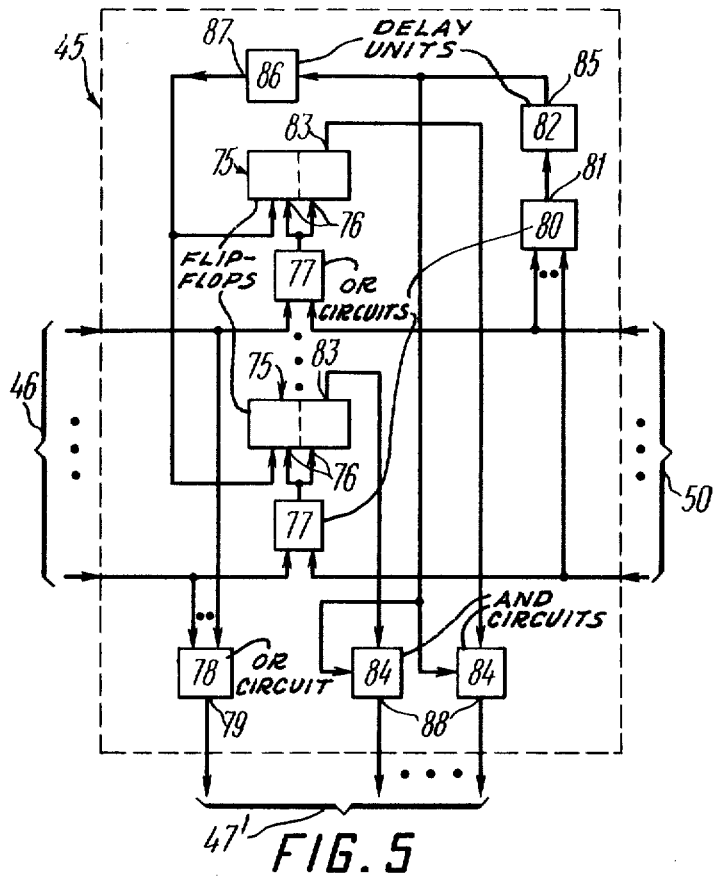
Figure 6:
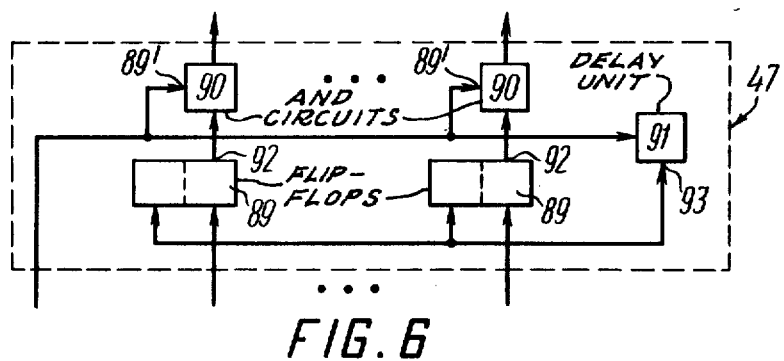
Figures 7, 8:
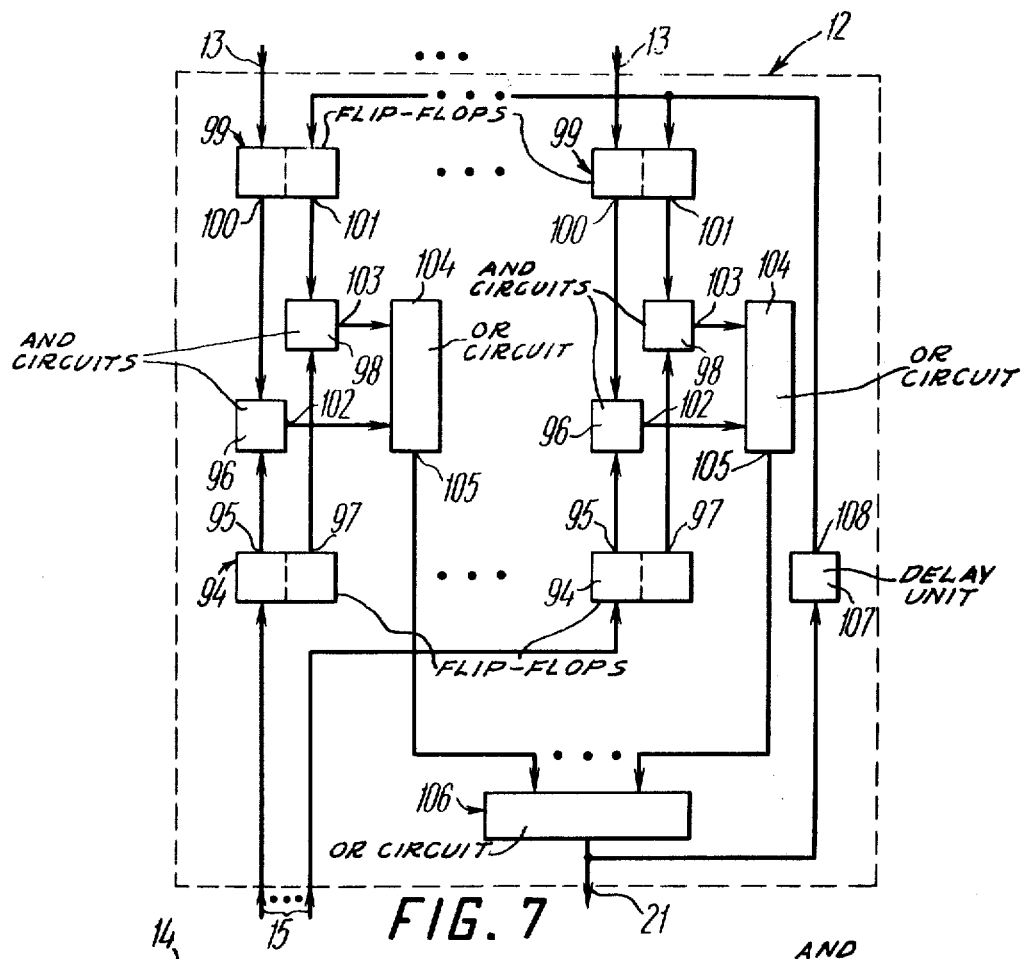
Figure 13:
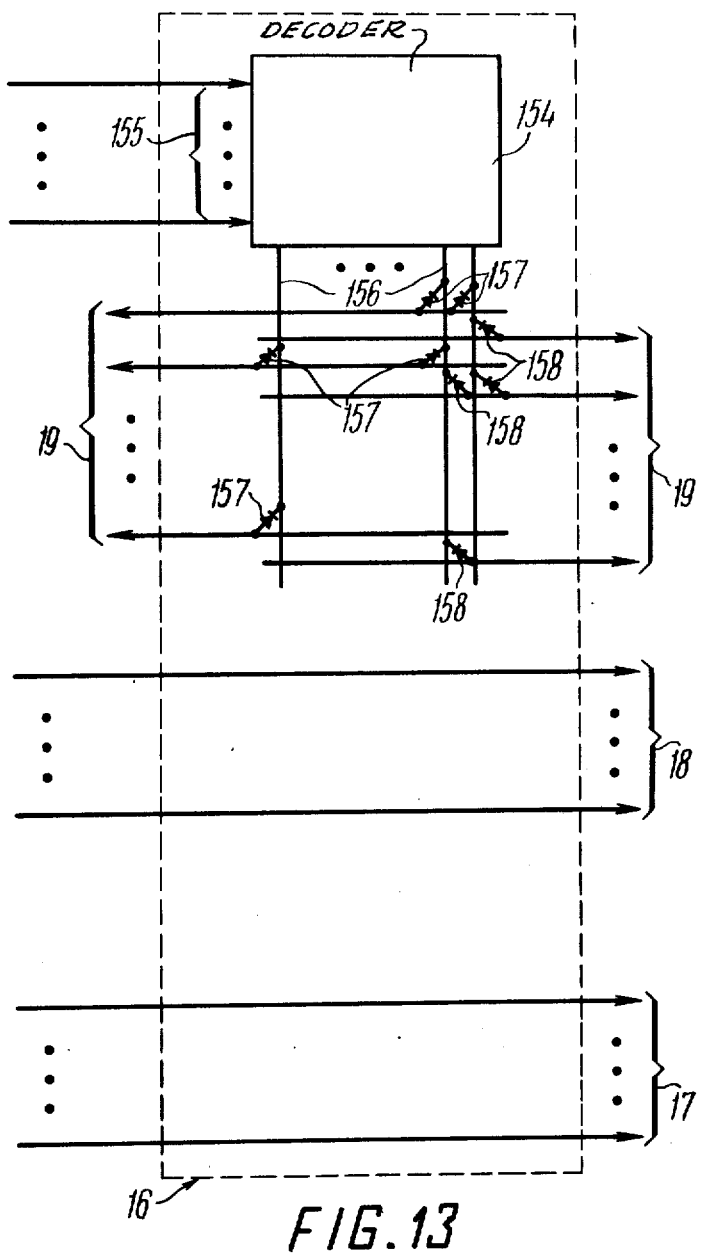
Figure 14:
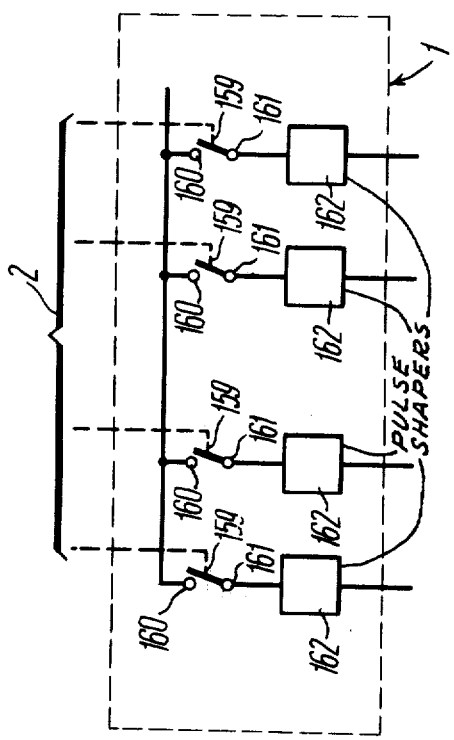
Figure 15:
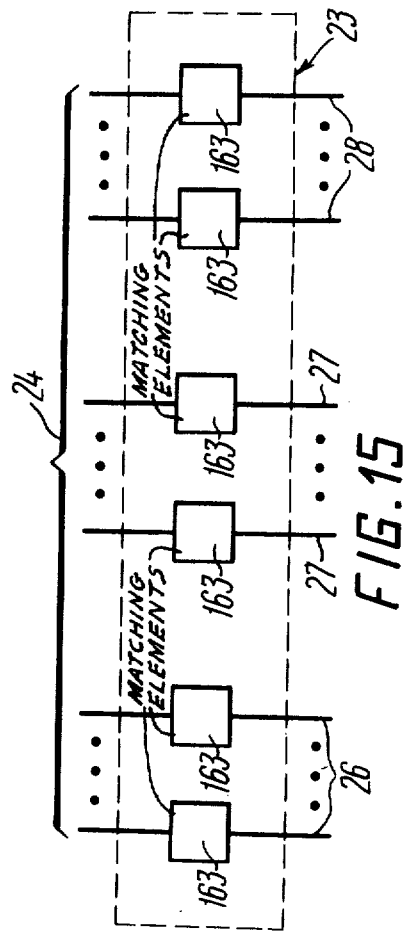
Figure 16:
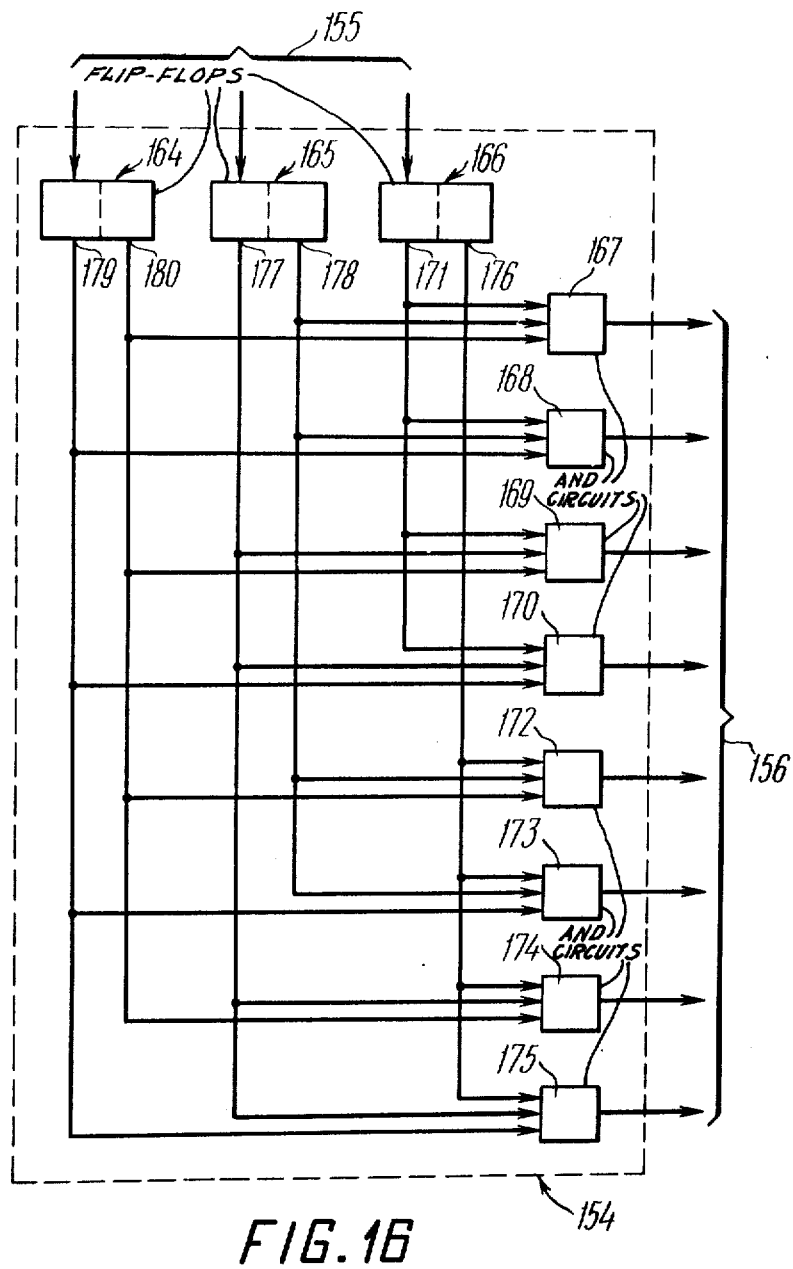

The invention can be more fully understood from the following detailed description of a preferred embodiment thereof when read with reference to the accompanying drawings, wherein:

FIG. 1 is a block diagram of the apparatus for presenting information;
FIG. 2 is a block diagram of the control unit;
FIG. 3 is a block diagram of the function converter;
FIG. 4 is a block diagram of the matrix converter;
FIG. 5 is a block diagram of the adder;
FIG. 6 is a block diagram of the delay unit;
FIG. 7 is a block diagram of the coincidence unit;
FIG. 8 is a block diagram of the switch;
FIG. 9 is a view of the instruction storage device;
FIG. 10 is a view of the storage device;
FIG. 11 shows the layout of locations of the storage device and the instruction storage device on a movie film strip;
FIG. 12 shows in block form the devices for controlling step motors of the storage device and the instruction storage device and also the synchronizer;
FIG. 13 is a schematic diagram of the selector;
FIG. 14 is a block diagram of the input unit;
FIG. 15 is a block diagram of the output unit;
FIG. 16 is a block diagram of the decoder.

Referring to FIG. 1 apparatus for presenting information is illustrated comprising an input unit 1 with its inputs 2 connected to an input signal source (not shown).

The apparatus also includes a control unit 3 with inputs 4 thereof connected to the input unit 1, an instruction storage device 5, a storage device 6, and a synchronizer 7, first outputs 8 of the synchronizer being connected to the instruction storage device 5 and second outputs 9, to the storage device 6.

The apparatus also comprises a function converter 10 having its inputs 11 connected to the control unit 3, a coincidence unit 12, first inputs 13 of which are connected to the output of the function converter 10, and a switch 14 the outputs of which are connected to second inputs 15 of the coincidence unit 12.

The apparatus comprises a selector 16 with outputs 17 and 18 thereof connected to the switch 14 and outputs 19, connected to the control inputs of the control unit 3.

Control outputs 20 of the control unit 3 are connected to the inputs of the instruction storage device 5 and the inputs of the switch 14, and an output 21 of the coincidence unit 12 is connected to the instruction storage device 5 outputs 22 of which are connected to the inputs of the selector 16.

The apparatus also comprises an output unit 23 coupled through electric circuits 24 with an external device 25, through electric circuits 26 with the control unit 3, through electric circuits 27 with the instruction storage device 5, and through electric circuits 28 with the function converter 10.

According to the invention, the unit 3 (FIG. 2) comprises input buses 29, AND circuits 30 and AND circuits 31.

Each pair of the AND circuits 30 and 31 and each input bus 29 correspond to one bit of a number in which some bits form the input instruction of the control unit 3 (FIG. 1), while the remaining bits correspond to the signal of the output unit 23.

Each input bus 29 (FIG. 2) is connected to the interconnected first inputs of a pair of the AND circuits 30 and 31.

The control unit 3 also has control inputs divided into two groups, one including input buses 32, and the other composed of input buses 33. The input buses 32 and 33 receive a control code and a reversal code supplied from the outputs 19 of the selector 16.

Each input bus 32 representing one bit of the control code is connected to a second input of one AND circuit 30 which corresponds to the same bit in the input instruction of the control unit 3.

Each input bus 33 representing one bit of the reversal code is connected to a second input of one AND circuit 31 which is associated with the same bit of the input instruction of the control unit 3.

Outputs 34 of the AND circuits 30 are connected to the inputs of an OR circuit 35, and outputs 36 of the AND circuits 31 are connected to the inputs of an OR circuit 37.

The outputs 34 and 36 of each pair of the AND circuits 30 and 31 are connected to a first and a second inputs of an AND circuit 38, respectively. The outputs of the AND circuit 38 are interconnected and form an output 39 of the control unit 3.

The outputs 34 and 36 of each pair of the AND circuits 30 and 31 are also connected to a first and a second inputs of an OR circuit 40, respectively.

Output buses 41 of OR circuits 40 serve as the outputs of the control unit 3 connected to the inputs 11 (FIG. 1) of the function converter 10.

An output 42 (FIG. 2) of the OR circuit 35, an output 43 of the OR circuit 37 and the output 39 of the control unit 3 form the control outputs 20 (FIG. 1) of the control unit 3.

Input buses 32 and 33 (FIG. 2) of the control unit 3 are connected to the outputs 19 (FIG. 1) of the selector 16.

The function converter 10 (FIG. 3) comprises a matrix converter 44 the inputs of which serving as the inputs 11 of the function converter 10 (FIG. 1) are connected to the control unit 3, an adder 45 (FIG. 3) with its first inputs 46 connected to the outputs of the matrix converter 44, a delay unit 47 connected to the outputs 47' of the adder 45, a second matrix converter 48 with its inputs 49 connected to the outputs of the delay unit 47.

Second inputs 50 of the adder 45 are connected to the outputs of the second matrix converter 48.

The outputs 47' of the adder 45 which serve as the outputs of the function converter 10 are also connected to the inputs 13 (FIG. 1) of the coincidence unit 12.

Each of the inputs 11 (FIG. 4) of the matrix converter 44 is coupled through one of isolating diodes 51 with a 1 input 52 of a flip-flop 53 and through one of isolating diodes 54 with inputs 55 of an OR circuit 56.

An output 57 of the OR circuit 56 is connected to an input of a delay unit 58 whose output 59 is connected to an input of a delay unit 60, an input of a delay unit 61, a first input of each AND circuit 62 and a first input of an AND circuit 63.

A 1 output 64 of each flip-flop 53 is connected to a second input of a corresponding AND circuit, a 1 output 64 of the flip-flop 53 corresponding to the last bit of the number delivered to the inputs 11 of the matrix converter 44 is connected to a second input of the AND circuit 63.

1 outputs 64 of the flip-flops 53 are also connected to the first inputs of corresponding AND circuits 65 in which the second inputs 66 are interconnected and taken to the output of the delay unit 61.

Each of outputs 67 of the AND circuits 62 is connected to an appropriate delay unit 68, while an output 69 of the AND circuit 63 is connected to a delay unit 70 with an output 71 thereof connected to the first inputs of AND circuits 72.

Outputs 73 of the AND circuits 72 act as a count input of the flip-flops 53.

The output of the delay unit 60 is connected to interconnected 0 inputs 74 of the flip-flops 53.

The output of each delay unit 68 is connected to the 1 input 52 of the flip-flop 53 which corresponds to the next bit of the number delivered to the inputs 11 of the matrix converter 44.

Second inputs of the AND circuits 72 are coupled through electric circuits 28 with the output unit 23 (FIG. 1).

The outputs of the AND circuits 65 which are the outputs of the matrix converter 44 are connected to the appropriate inputs 46 (FIG. 3) of the adder 45.

The matrix converter 48 is designed in a way similar to the matrix converter 44 (FIG. 4).

The adder 45 (FIG. 5) comprises flip-flops 75 in which each count input is connected to an output of a corresponding OR circuit 77.

Each input 46 of the adder 45 corresponding to one bit of the number delivered from the output of the matrix converter 44 is connected to the input of an appropriate OR circuit 77.

Each input 50 of the adder 45 associated with the same-order bit of the number delivered from the output of the matrix converter 48 is connected to a second input of an appropriate OR circuit 77.

Besides, the inputs 46 of the adder 45 are connected to the inputs of an OR circuit 78 whose output 79 is a sync output of the adder 45.

The inputs 50 of the adder 45 are also connected to the inputs of an OR circuit 80 which has its output 81 connected to the input of a delay unit 82.

An output 83 of each flip-flop 75 is connected to a first input of a corresponding AND circuit 84, second inputs of the AND circuits 84 are interconnected and coupled with an output 85 of the delay unit 82 and to an input of a delay unit 86 with an output 87 thereof connected to the interconnected 0 inputs of the flip-flops 75.

Outputs 88 of the AND circuits 84 and the sync output 79 of the OR circuit 78 serve as the outputs 47' of the adder 45 and are connected to the first inputs 13 (FIG. 1) of the coincidence unit 12.

The delay unit 47 (FIG. 6) comprises flip-flops 89 in which 1 inputs are separately connected to outputs 88 (FIG. 5) of the AND circuits 84 of the adder 45. The sync output 79 of the adder 45 is connected to the interconnected first inputs 89' (FIG. 6) of AND circuits 90 and an input of a delay unit 91.

A unity output 92 of each flip-flop 89 is connected to the second input of the corresponding AND circuit 90. An output 93 of the delay unit 91 is connected to the interconnected 0 inputs of the flip-flops 89.

The output of each AND circuit 90 is connected to the appropriate input 49 (FIG. 3) of the matrix converter 48.

The coincidence unit 12 (FIG. 7) comprises monostable flip-flops 94 in which 1 inputs are the second inputs 15 (FIG. 1) of the coincidence unit 12. A unity output 95 (FIG. 7) of each flip-flop 94 is connected to a first input of an appropriate AND circuit 96, while its 0 output 97 is taken to a first input of an appropriate AND circuit 98.

The coincidence unit 12 comprises also flip-flops 99 the number of which is equal to the number of flip-flops 94. The unity inputs of the flip-flops 99 are the first inputs 13 (FIG. 1) of the coincidence unit 12. A unity output 100 (FIG. 7) of each flip-flop 99 is connected to a second input of the appropriate AND circuit 96, and a 0 output 101 is connected to the second input of the appropriate AND circuit 98.

Outputs 102 of the AND circuits 96 and outputs 103 of the AND circuits 98 are connected to the inputs of corresponding OR circuits 104, and an output 105 of each OR circuit 104 is connected to a corresponding input of an OR circuit 106. An output of the OR circuit 106 serves as the output 21 (FIG. 1) of the coincidence unit 12. The output 21 (FIG. 7) is also connected to an input of a delay unit 107 which has an output 108 connected to the interconnected 0 inputs of the flip-flops 99.

The switch 14 (FIG. 8) contains AND circuits 109 inputs of which act as the inputs of the switch 14 and are connected to the output 17 (FIG. 1) of the selector 16.

The switch 14 also includes AND circuits 110 inputs of which being other inputs of the switch 14 are connected to the outputs 18 (FIG. 1) of the selector 16.

The output of each AND circuit 109 (FIG. 8) is connected to an output of the appropriate AND circuit 110 and is also coupled with one of the second inputs 15 (FIG. 1) of the coincidence unit 12.

The second inputs of the AND circuits 109 (FIG. 8) are interconnected and taken to a 1 output III of a flip-flop 112, while second inputs of the AND circuits 110 are interconnected and coupled with a 0 output 113 of the same flip-flop 112.

A unity input and a 0 input of the flip-flop 112 are connected, respectively, to the outputs 42 and 43 (FIG. 2) of the control unit 3.

The instruction storage device 5 (FIG. 9) comprises a storage medium 114 (movie film strip), an exposure aperture 115, and a driving drum 124 geared to a step motor 117. The instruction storage device 5 also contains a projection lamp 118 (the power supplies for the lamp 118 and step motor 117 are not shown on FIG. 9), photosensitive elements 119, each of which is connected to an appropriate input 120 of the pulse shaper unit 121, the outputs of which coincide with the outputs 22 of the instruction storage device 5.

The storage device 6 contains also a lamp 126, a condenser 127 disposed on the same optical axis as the lamp, a lens 128, and a screen 129. By the optical axis is meant a conventional line drawn through the filament of the lamp 126, and the centers of the condenser 127, the exposure aperture 123, the lens 128, and the screen 129.

The film strip 114 (FIG. 11) consists of a series of locations 130 which contain black and white code markings 131, the number of the code marking being equal to the number of photo-sensitive elements 119 (FIG. 9).

The film strip 122 (FIG. 11) consists of a series of locations 132 (frames) which hold word or graphic information (not shown) projected onto the screen 129 and retrieved by means of the apparatus of this invention.

Lines 133 (FIG. 11) indicate the locations 130 on the film strip 114 analogous to the locations 132 on the film strip 122.

FIG. 12 represents a control diagram of the step motor (FIG. 9) of the instruction storage device and of the step motor 125 (FIG. 10) of the storage device 6 as well as the synchronizer 7 (FIG. 1).

The control circuitry of the step motors 117 and 125 comprises a control unit 134 connected to the step motor 117 via electric circuits 135. An input 136 of the control unit 134 is connected to an AND circuit 137, while an input 138 is connected to an AND circuit 139.

The control circuitry includes also a control unit 140 connected to the step motor 125 via electric circuits 141. An input 142 of the control unit 140 is connected to an AND circuit 143 and its input 144 is connected to and AND circuit 145.

The control circuit of FIG. 12 also comprises a pulse generator 146 which is part of the synchronizer 7 and may be, for example, a multivibrator, an output 147 of which is connected to the interconnected first inputs of the AND circuits 143 and the AND circuits 145, while an output 147' is connected to the interconnected first inputs of the AND circuits 137 and the AND circuits 139.

Interconnected second inputs of the AND circuit 137 and of the AND circuit 143 are connected to a unity output 148 of a flip-flop 149; interconnected second inputs of the AND circuit 139 and of the AND circuit 145 are connected to a unity output 150 of a flip-flop 151.

The 0 inputs of the flip-flops 149 and 151 are interconnected and coupled with an output 152 of an OR circuit 153.

The unity input of the flip-flop 149 is connected to the output 42 (FIG. 2) of the OR circuit 35 of the control unit 3.

The unity input of the flip-flop 151 (FIG. 12) is connected to the output 43 (FIG. 2) of the OR circuit 37 of the control unit 3. One input of the OR circuit 153 (FIG. 12) is connected to the output 39 (FIG. 2) of the control unit 3, and the other input of the OR circuit 153 (FIG. 12) is connected to the output 21 (FIG. 1) of the coincidence unit 12. The electric circuits 27 (FIG. 1) are connected to the inputs 136 (FIG. 12) and 138.

The selector 16 (FIG. 13) comprises a decoder 154 with its inputs 155 connected to the appropriate outputs 22 of the instruction storage device 5.

Each output bus 156 of the decoder 154 is coupled by diodes 157 with corresponding outputs 19 of the selector 16 and by diodes 158 with the remaining outputs 19 of the selector 16.

A concrete arrangement of the diodes 157 and 158 depends on what control code received at the input buses 32 (FIG. 2) of the control unit 3 and what reversal code received at the input buses 33 of the control unit 3 correspond to each output bus 156 (FIG. 13) of the decoder 154.

The output buses 156 of the decoder 154, the diodes 157 and 158 and the outputs 19 form a permanent storage device to hold control codes and reversal codes.

The input unit 1 (FIG. 14) contains keys 159 for receiving an input signal. First terminals 160 (FIG. 14) of the keys 159 are interconnected and their common point is connected to a supply source (not shown). Second terminals 161 of the keys 159 are connected to the inputs of pulse shapers 162. The outputs of the pulse shapers 162 are connected to the inputs 4 of the control unit 3.

The output unit 23 (FIG. 15) comprises matching elements 163 coupled with the external device 25 via the electric circuits 24 (FIG. 1), with the control unit 3 via the electric circuits 26, with the instruction storage device via the electric circuits 27, and with the function converter 10 via the electric circuits 28.

The decoder 154 (FIG. 16 contains monostable flip-flops 164, 165, 166, whose 1 inputs serve as the inputs 155 (FIG. 13) of the decoder 154.

The decoder 154 (FIG. 16) comprises also an AND circuit 167, an AND circuit 168, an AND circuit 169 and an AND circuit 170; first inputs of these circuits are interconnected and coupled with a unity output 171 of the flip-flop 166.

The decoder 154 includes an AND circuit 172, and AND circuit 173, an AND circuit 174, and an AND circuit 175, first inputs of which are interconnected and coupled with a 0 output 176 of the flip-flop 166.

Second inputs of the AND circuit 169, the AND circuit 170, and AND circuit 174 and the AND circuit 175 are connected together and to a unity output 177 of the flip-flop 165.

Second inputs of the AND circuit 167, the AND circuit 168, the AND circuit 172, and the AND circuit 173 are connected together and to a 0 output 178 of the flip-flop 165.

Third inputs of the AND circuit 168, the AND circuit 168, the AND circuit 170, the AND circuit 173, the AND circuit 175 are interconnected and coupled with a unity output 179 of the flip-flop 164.

Third inputs of the AND circuit 167, the AND circuit 169, the AND circuit 172, the AND circuit 174 are interconnected and coupled with a 0 output 180 of the flip-flop 164. Outputs of the AND circuit 167, and AND circuit 168, the AND circuit 169, the AND circuit 170, the circuit 172, the AND circuit 173, the AND circuit 174, and the AND circuit 175 form the output buses 156 (FIG. 13) of the decoder 154.

The apparatus for presenting information used, for example, as a teaching machine, fully realizes the above described modern programmed instruction, including regular testing of student's performance by means of interrogations so that in the case of a correct response to a multiple-choice question the student selects a frame with new information, and if the answer was wrong, the film is reversed in order that the exercise may be repeated. Each answer to an interrogation posed (both correct and incorrect) determines selection of the next frame with information images, said frame with information depending not only on the student's response to the question posed, but also on the entire teaching history, i.e. the answers to the previous question frames. This procedure makes it possible to take into account personal qualities of the student and, consequently, raises the efficiency of the teaching process.

The apparatus for presenting information operates as follows.

The input unit 1 (FIG. 1) receives an input signal which is a binary number representing the coded address of required information and passes it to the inputs 4 of the control unit 3.

The control unit 3 is intended for converting the binary code of its input instruction into another binary number in which some bits form the output instruction of the control unit 3, and the remaining bits represent a control instruction of the control unit 3.

The output instruction of the control unit 3 is sent to the inputs of the function converter 10, is converted into a code coinciding with the address of one of the locations of the instruction storage device 5 and applied to the first inputs 13 of the coincidence unit 12.

The control instruction is delivered from the control outputs 20 of the control unit 3 to the inputs of the switch 14 which, in response to this instruction, connects the second inputs 15 of the coincidence unit 12 to the outputs 17 or 18 of the selector 16. The control instruction is sent also to the inputs of the instruction storage device 5 comprising locations for storing instructions, and the device starts selection of these locations in an ascending or descending order and connects them alternately to the output 22.

From the output 22, the binary instruction code held in a selected location of the instruction storage device 5 is applied to the input of the selector 16, and upon conversion goes to the outputs 17, 18 and 19 of the selector 16.

The outputs 17 receive a binary number representing the first address of the location selected in the instruction storage device 5, the outputs 18 accept a binary number representing the second address of this location, and the outputs 19 receive a binary number representing a control code and a reversal code with determine the law of conversion of the control instruction from the control unit 3 into its ouput and control instructions.

Thus one of the addresses of the location of the instruction storage device 5 connected at a given moment to the output 22 is delivered through the selector 16 and the switch 14 to the second inputs 15 of the coincidence unit 12 and is compared therein with the instruction previously delivered to its first inputs 13 and stored in the device. If the instruction applied to the inputs 13 and the address delivered to the inputs 15 disagree, no signal appears across the output 21 of the coincidence unit 12. In this case, the instruction storage device 5 continues scanning of the locations and connects the next location to the output 22. One of the addresses of this location is fed through the selector 16 and the switch 14 to the second inputs 15 of the coincidence unit 12 and compared with the same instruction previously received by its first inputs 13. In this way, selection of the locations in the instruction storage device 5 continues until the location address applied to the second inputs 15 of the coincidence unit 12 coincides with the instruction previously received by its first inputs 13.

If the instruction and the address coincide, the coincidence unit 12 generates a signal which goes from the output 21 to the input of the instruction storage device 5 and stops the device. This completes the first operation cycle of the apparatus.

The location of the instruction storage device 5 connected at the instant its address and the instruction stored in the coincidence unit 12 coincide, is the location holding desired information.

The control code and the reversal code stored in this location of the instruction storage device 5 are sent from the outputs 19 of the selector mechanism 16 to the control inputs of the control unit 3 and prepare the apparatus for the next operation cycle.

The synchronizer 7 of the instruction storage device 5 controls selection of locations in the storage device 6 intended for storage of desired information.

Each location in the instruction storage device 5 corresponds to a location in the storage device 6. The synchronizer 7 selects a location of the storage device 6 which corresponds to a required location in the instruction storage device 5.

The information stored in this location of the storage device 6 is projected onto the screen 129 (FIG. 10) and is used by the student for learning purposes.

Operation of the apparatus in the subsequent cycles is identical with the operation described above.

The functional capabilities of the apparatus can be extended through using information received from the external device 25 (FIG. 1) via the output unit 23.

The purpose of the output 23 is an exchange of information between the control unit 3, the function converter 10, the instruction storage device 5, and the external device 25.

Information fed in the form of a binary number from the external device 25 through the electric circuits 24 to the output unit 23 is converted in the output unit 23 and delivered through the electric circuits 26, 27 and 28, respectively, to the control unit 3, the instruction storage device 5, and the function converter 10.

The information supplied through the electric circuits 26 determines, together with the control code and the reversal code, the law of conversion of the input instruction in the control unit 3 into its output and control instructions.

The information delivered through the circuits 27 to the input of the instruction storage device 5 serves for initiating location-by-location selection in the instruction storage device 5.

The information fed through the electric circuits 28 to the input of the function converter 10 is intended for altering the law of conversion in the function converter 10.

The information delivered through the output unit 23 along the electric circuits 26, 27, 28 to the external device 25 from the control unit 3, instruction storage device 5 and the function converter 10, respectively, is used to control the external device 25 which may be, for example, an electronic computer.

The control unit 3 (FIG. 2) is prepared for operation by an instruction fed from the output 19 (FIG. 1) of the selector 16. This instruction consists of binary numbers representing the control code and the reversal code which are fed, respectively, to the input buses 32 (FIG. 2) and 33 of the control unit 3.

Each bit of the control code is delivered through the input bus 32 of the control unit 3 to an appropriate second input of the AND circuit 30, while each bit of the reversal code is delivered through the input bus 33 to an appropriate input of the AND circuit 31.

The input instruction fed to the inputs 4 (FIG. 1) of the control unit 3 is a binary number in which one bit is a unity and other bits are zeroes. The I bit corresponds to the number of the key 159 (FIG. 14) depressed on the input unit 1 (FIG. 1).

If there is no signal at the input bus 29 representing one bit of the input instruction, no signals will be produced across the outputs 34 and 36 of the AND circuits 30 and 31, respectively, regardless of signals delivered to the input buses 32 and 33 corresponding to the input bus 29, because the AND circuit 30 and the AND circuit 31 are cut off.

Consider a situation when a signal appears across the input bus 29 corresponding to the 1 bit of the input instruction.

Let it be assumed that a signal is fed to the input bus 32 corresponding to the same bit, while the input bus 33 carries no signal.

In this case, the AND circuit 30 conducts and its signal from the output 34 passes to the first input of the OR circuit 40 or to one of the inputs of the OR circuit 35. The OR circuit 40 generates a signal representing one bit of the output instruction of the control unit 3 which is sent from the output bus 41 of the OR circuit 41 to an appropriate input 11 of the function converter 10 (FIG. 1). A signal from the output 42 (FIG. 2) of the OR circuit 35 corresponds to one bit of the control instruction of the control unit 3.

This control instruction is furnished from the control output 20 (FIG. 1) of the control unit 3 to the control input of the switch 14 and to the input of the instruction storage device 5 which starts selection of its locations in the increasing order of their numbers.

If signals are applied to the input buses 29 (FIG. 2) and 33, the output signal is produced at the output bus 41 of the OR circuit 40, while the control instruction is generated across the output 43 of the OR circuit 37. In response to this control instruction the instruction storage device 5 starts selection of its locations in a descending order.

If signals are delivered to all the input buses 29, 32 and 33 of the control unit 3, the AND circuit 38 is triggered on and all the control outputs 39, 42 and 43 generate a control instruction. The control instruction from the output 39 stops location selection in the instruction storage device 5 (FIG. 1).

The OR circuit 40 (FIG. 2) is also triggered on and the signal from its output bus 41 goes to the appropriate input II (FIG. 1) of the function converter 10.

The function converter 10 (FIG. 1) which is a finite automation is used to convert the output instruction of the control unit 3 into a code to be delivered to the first inputs 13 of the coincidence unit 12 which coincides with the address of one of the locations in the instruction storage device 5.

Let $x$ be a plurality of binary numbers $x$ each of which is one of the output instructions of the control unit 3 to be fed to the inputs 11 of the function converter 10;

let also $y$ be a plurality of binar numbers $y$, each binary number being one of the codes fed to the first inputs 13 of the coincidence unit 12, and T be a plurality of operation cycles $t$ ($t = 1, 2 \ldots$) of the apparatus.

Then conversion performed in the finite automation is carried out in accordance with two transfer functions $\lambda$, $\delta$ inserted in the automation:

$$q(t+1) = \lambda(q(t), x(t+1)) \, x \in X \quad (1)$$

$$y(t+1) = \delta(q(t), x(t+1)) \, y \in Y \quad (2)$$

where $q \in Q$ is a plurality of binary numbers called inner states of the finite automaton.

Signals delivered to the function converter 10 through the electric circuits 28 set a concrete form of the transfer functions $\lambda$ and $\delta$.

An embodiment of the function converter 10 (FIG. 1) is shown in FIG. 3. It is a particular case of the finite automaton if the transfer function $\lambda$ is linear, and the transfer function $\delta$ is identical:

$$y(t) \equiv q(t) \quad (3)$$

$$y(t+1) = \lambda(y(t), x(t+1)) = Fy(t) + G x(t+1); \quad (4)$$

where:

F and G are transfer matrices (Kalman, Farb Arbib. "Synopsis of mathematical theory of systems", 1971, p.269) into which the linear transfer function $\lambda$ is expanded.

The output instruction $x$ ($t + 1$) of the control unit 3 fed to the inputs 11 (FIG. 3) of the function converter 10 during a cycle ($t + 1$) is converted by the matrix converter 44 in conformity with the transfer matrix G and delivered to the first inputs 46 of the adder 45.

The code $y$ ($t$) obtained at the outputs 47' of the adder 45 during the previous cycle $t$ is applied to the inputs of the delay unit 47 and stored therein until the onset of the cycle ($t$+1). When the cycle ($t$+1) starts, the code $y$ ($t$) is delivered to the inputs 49 of the matrix converter 48, converted in accordance with the transfer matrix F and goes to the second inputs 50 of the adder 45. During the cycle ($t$+1), the outputs 47' of the adder 45 generate a code $y(t$+1) which is also fed to the inputs of the delay unit 47 and to the first inputs 13 of the coincidence unit 12. Thus the code $y(t)$ delivered from the outputs 47' of the adder 45 to the first inputs 13 (FIG. 1) of the coincidence unit is determined not only by the input signal applied to the input 2 of the input unit 1 and converted in the control unit 3, but also by the input signal received by the input 2 in the previous operation cycle.

The signals delivered through the electric circuits 28 to the matrix converters 44 and 48 (FIG. 3) devine a concrete form of the transfer matrices F and G.

The matrix converters 44 and 48 (FIG. 3) perform the mathematical multiplication of the binary number received at their inputs 11 and 49, respectively, by the matrices G and F, respectively.

One of the ambodiments of the matrix conveter 44 is represented in FIG. 4.

The matrix converter 44 multiplies the binary number fed to its inputs 11 by the matrix G in a canonical form:

$$G = \begin{pmatrix} 0 & 0 & 0 & \ldots & 0 & a_1 \\ 1 & 0 & 0 & \ldots & 0 & a_2 \\ 0 & 1 & 0 & \ldots & 0 & a_3 \\ \ldots & \ldots & \ldots & \ldots & \ldots & \ldots \\ 0 & 0 & 0 & \ldots & 1 & a_n \end{pmatrix} \quad (5)$$

where elements $a_1 \ldots a_n$ are 0's and 1's.

As is known from algebra, any matrix can be reduced to such a canonical form.

The output instruction of the control unit 3 (FIG. 1) is applied in the form of a binary number to the inputs 11 (FIG. 4) of the matrix converter 44 and further through the isolating diodes 51 to the 1 inputs 52 of the flip-flops 53. The flip-flops 53 which received 1 to their inputs 52 are set to 1 and the 1 outputs 64 of these flip-flops 53 produce a signal which goes, respectively, to the second inputs of the AND circuits 62 and to the AND circuits 63 and the first inputs of the AND circuits 65.

The output instruction of the control unit 3 (FIG. 1) delivered to the inputs 11 (FIG. 4) of the matrix converter 44 through the isolating diodes 54, is also fed to the inputs 55 of the OR circuit 56, and from its output 57 to the input of the delay unit 58 which has a delay time $\tau_1$ sufficient for resetting the flip-flops 53.

Upon the lapse of the time $\tau_1$, the signal from the output 59 of the delay unit 58 goes to the first inputs of the AND circuits 62 and to the AND circuits 63. The signal from the output 67 of the same AND circuits 62 which also receive a signal from the 1 outputs 64 of the flip-flops 53 to their second inputs, is applied to the inputs of the delay units 68. Likewise, a signal from the output 69 of the AND circuit 63 goes to the input of the delay unit 70 only if a signal from the 1 output 64 of the flip-flop 53 is fed to the second input of the AND circuit 63.

The signal from the output 59 of the delay unit 58 also goes to the input of the delay unit 60 which has a delay time $\tau_2$ sufficient for rewriting the signal from the 1 output 64 of the flip-flop 53 into the delay units 68 and 70. After the time lapse $\tau_2$ the signal from the output of the delay unit 60 is applied to the interconnected 0 inputs 74 of the flip-flops 53 and resets them to a 0 state.

After the delay time $\tau_3$ of the delay unit 68 ($\tau_3 > \tau_2$), the signal from the outputs of these units is applied to the 1 inputs 52 of the flip-flops 53 corresponding to the next bits and changes their states. Thus the binary number delivered to the inputs 11 of the matrix converter 44 will be shifted one bit in a shift register formed by the flip-flops 53 and the delay units 68.

If the output 64 of the flip-flop 53 corresponding to the last bit of the binary number carries a 1 signal, this signal is fed through the AND circuit 63 to the input of the delay unit 70; then, after the delay time $\tau_3(\tau_3 > \tau_2)$, the signal is delivered from the output 71 of this unit 70 to the interconnected first inputs of the AND circuits 72 in which the second inputs accept a signal from the output unit 23 through the electric circuits 28 (FIG. 1).

Each electric circuit 28 corresponds to an element a in the transfer matrix G and the signal is fed through this circuit if the value of the element a is 1.

The signals from the outputs 73 (FIG. 4) of those AND circuits 72 which have coincident input signals, are fed to the count inputs of the flip-flops 53 and reset these flip-flops to an opposite state. The binary number produced at the 1 outputs of 64 of the flip-flops 53 is the product of the output instruction of the control unit 3 (FIG. 1) delivered to the inputs 11 (FIG. 4) of the matrix converter 44, multiplied by the matrix G.

The signal from the output 59 of the delay unit 58 is also sent to the input of the delay unit 61; after the delay time $\tau_4(\tau_4 > \tau_3)$ the signal appears at the output of this unit 61 to be delivered to the second inputs 66 of the AND circuits 65, while the signals from the 1 outputs 64 of the flip-flops pass through these AND circuits 65 and go to the first inputs 46 (FIG. 3) of the adder 45.

The matrix converter 48 operates in the same manner as the matrix converter 44 that has been discussed.

The adder 45 (FIG. 5) performs bit-by-bit addition of the two binary numbers received, respectively, at the inputs 46 and after a certain time sufficient for resetting the flip-flops 75, at the inputs 50.

The input signal corresponding to 1 across one input 46 of the adder 45 passes through the OR circuit 77 and to the count input 76 of the flip-flop 75, causing its setting from 0 to 1. This operation is accompanied by the appearance of a signal across the sync output 79 of the OR circuit 78 which is to be described below.

The second binary number is applied to the inputs 50 of the adder 45 with a time delay with respect to the binary number at the inputs 46. The input signal corresponding to 1 at one of the inputs 46, 50 goes through the OR circuit 77 to the count input 76 of the flip-flop 76, changing the flip-flop to the opposite state. Thus each flip-flop 75 performs modulo addition of the two signals supplied to the inputs 46 and 50, while the entire adder 45 effects modulo-2 addition of bits of the two binary numbers received at the inputs 46 and 50.

At the same time the signal from the inputs 50 is supplied to the inputs of the OR circuit 80 and from its output 81 to the input of the delay unit 82 which has a delay time $\tau_5$ sufficient for resetting the flip-flops 75. The signal from the output 81 of the delay unit 80 is applied to the inputs of the AND circuits 84 and as a result, the outputs 88 produce a binary number equal to the sum of the binary numbers fed to the inputs 46 and 50 of the adder 45 and representing the code applied to the inputs of the delay unit 47 (FIG. 3) and to the first inputs 13 (FIG. 1) of the coincidence unit 12.

The signal from the output 85 (FIG. 5) of the delay unit 82 is also applied to the input of the delay unit 86 which has a delay time $\tau_6$ sufficient for resetting the flip-flops of other units connected to the outputs 47' of the adder 45 which is connected with the inputs 13 of the coincidence unit 12.

The signal delivered from the output 87 of the delay unit 86 to the 0 inputs of the flip-flops 75 changes them into the initial (0) state.

The code from the outputs 88 of the adder 45 is fed to the 1 inputs of the flip-flops 89 (FIG. 6) of the delay unit 47 and resets the flip-flops which received a signal equal to 1 at their 1 inputs in a corresponding code bit.

Thus the 1 outputs 92 of the flip-flops 89 produce a binary number which coincides with the code applied to the inputs of the delay unit 47.

Upon receipt of the next binary number across the inputs 46 (FIG. 5) of the adder 45, the signal from its sync output 79 goes to the interconnected first inputs 89' of the AND circuits 90 and of the delay unit 91. The resulting signal appearing at the outputs of the delay unit 47 will be a binary number coinciding with the code fed to the inputs of the delay unit 47 during the previous operation cycle of the apparatus. After a delay time $\tau_7$ sufficient for rewriting the code at the flip-flops of the matrix converter 48 (FIG. 3), the signal from the output 93 of the delay unit 91 resets the flip-flops 89 (FIG. 6) to 0.

The coincidence unit 12 (FIG. 7) serves for comparing binary numbers fed to its inputs 13 and 15.

A binary number received at the inputs 13 is stored by its flip-flops 99.

If the flip-flop 99 of one bit is set to 1, its output is 100 and, consequently, the AND circuit 96 generates an output signal. If the flip-flop 94 is in the 0 state, its output 97 and, consequently, the input of the other AND circuit 98 carry a signal, therefore, there will be no signals across the outputs 103 and 102 of these AND circuits 96, 98.

Contrariwise, if the flip-flop 94 is also set to 1, the signal is generated by its output 95, consequently, the signals are fed to both inputs of the AND circuit 96. As a result, its output 102 produces a signal which is delivered through the OR circuit 104 to its output 105 and to the corresponding input of the AND circuit 106 which means that the bits of the numbers fed to the inputs 13 and 15 coincide.

If both flip-flops 99 and 94 are in the 0 state, the signal appears across the output 103 of the AND circuit 98, passes through the OR circuit 104 and arrives at an appropriate input of the AND circuit 106. This also shows that the bits of the numbers across the inputs 13 and 15 coincide.

If all the bits of the numbers delivered to the inputs 13 and 15 are coincident, the signal is applied to all the inputs of the AND circuit 106 and the output 21 of the coincidence unit 12 produces a signal indicating that the two numbers coincide.

The signal from the output 21 also goes to the input of the delay unit 107 which has a delay time sufficient for resetting the flip-flops of other units connected to the output 21 of the coincidence unit 12.

The signal from the output 108 of the delay unit 107 arrives at the 0 inputs of the flip-flops 99 and resets them into the initial (0) state.

The switch 14 (FIG. 8) is intended for connection of the outputs 17 or 18 of the selector 16, respectively, to the second inputs 15 (FIG. 1) of the coincidence unit 12.

If a control instruction is fed from the control output 42 (FIG. 2) of the OR circuit 35 in the control unit 3 to the 1 input of the flip-flop 112 (FIG. 8), the 1 output 111 (FIG. 8) of this flip-flop 112 produces a signal and, consequently the second inputs of the AND circuits 109 also receive signals. As a result, the outputs 17 (FIG. 1) of the selector will be connected to the second input 15 of the coincidence unit 12.

If a control instruction is fed from the output 43 (FIG. 2) of the OR circuit 37 in the control unit 3 to the 0 input of the flip-flop 112 (FIG. 8), the signal from the 0 output 113 (FIG. 8) of this flip-flop 112 is applied to the second inputs of the AND circuits 110, and, as a consequence, the outputs 18 (FIG. 1) of the selector 16 will be connected to the second input 15 of the coincidence unit 12.

The instruction storage device 5 (FIG. 9) stores and selects its locations in an increasing or decreasing order and connects these locations to the output 22.

The locations 130 (FiG. 11) of the instruction storage device are located on the storage medium 114 (a movie film strip) which is movable in the forward and reverse directions, i.e. in the order of increasing and decreasing location numbers, with the aid of the driving drum 116 geared to the electric step motor 117. As the film strip advances, the instruction stored in the location 130 (FIG. 11) which is at a given moment displayed in the exposure aperture 115 (FIG. 9) is projected onto the photo-sensitive elements 119 (FIG. 9), the instruction being a binary number in the form of black and white code markings 131 (FIG. 11). The photo-sensing elements 119 which sense white code markings 131 (FIG. 11) generate output signals delivered to the appropriate inputs 120 (FIG. 9) of the pulse shaper unit 121. At the same time, the signals from its outputs coinciding with the outputs 22 (FIG. 1) of the instruction storage device 5 are fed to the input of the selector 16.

The storage device 6 (FIG. 10) is intended for storing word and graphic information to be presented in the apparatus which is held in the locations 132 (FIG. 11) on the storage medium 122 (FIG. 9). The locations 132 (FIG. 11) in the storage device 6 (FIG. 10 are selected by moving the storage medium 122 in the forward and reverse directions, i.e. in the increasing or decreasing order of the numbers of the locations 132 (FIG. 11). The film strip is moved by means of the driving drum 124 (FIG. 10) geared to the step motor 125. The information image stored in the same location 132 (FIG. 11) which is displayed in the exposure aperture 123 (FIG. 10) is projected onto the screen 129 with the aid of the projection system comprising the lamp 118, the condenser 127 and the lens 128.

The control circuit of the step motor 117 (FIG. 12) comprises the control unit 134 for regulating the step motor 117 which switches the windings of the motor in response to pulses delivered to the inputs 136 and 138. Each pulse received at the input 138 causes the step motor to rotate one step in the forward direction, while the pulse supplied to its input 136 initiates a one-step rotation backwards.

The control circuit of the step motor 125 (FIG. 12) contains the unit 140 for controlling the step motor 125 with the inputs 144 and 142. The pulses fed to these inputs 144 and 142 cause rotation of the motor 125 in the forward and reverse directions, respectively.

The pulse generator 146 generates pulses which are fed to the interconnected first inputs of the AND circuits 143 and 145 from its output 147, and to the interconnected first inputs of the AND circuits 137 and 139 from its output 147'.

Pulse arriving at the outputs 147 and 147' of the pulse generator 146 are synchronized.

The control circuit of the motors 117 and 125 comprises the flip-flop 151 which receives at its 1 input a signal from the control output 42 (FIG. 2) of the OR circuit 35 of the control unit.

The signal received triggers the flip-flop 151 (FIG. 12) into the other state and the output 150 sends a signal to the second inputs of the AND circuits 139 and 145.

These circuits AND 139 and 145 are triggered on and start conducting pulses from the outputs 147' and 147, respectively, to the inputs 138 and 144 of the control units 134 and 140 for regulating the step motors 117 and 125, respectively, so that the motors 117 and 125 begin to rotate synchronously in the forward direction.

The step motors 117 and 125 are stopped by a signal delivered to one of the inputs of the OR circuit 153 from the output 21 (FIG. 1) of the coincidence unit 12 or from the output 39 (FIG. 2) of the control unit 3. One of these signals resets the flip-flop 151 (FIG. 12) to 0, the AND circuits 139 and 145 cease to conduct, no pulses are fed to the inputs 138 and 144 and the motors 117 and 125 stop.

The control circuit for the step motors 117 and 125 includes the flip-slop 149 which receives a signal from the control output 43 (FIG. 2) of the OR circuit 37 in the control unit 3 at its 1 input. This signal causes a reset of the flip-flop 149 (FIG. 12) so that the signal from its output 148 triggers on the AND circuits 137 and 143. The circuits 137 and 143 pass pulses from the outputs 147' and 147 of the pulse generator 146 to the inputs 136 and 142 of the control units 134 and 140 of the step motors 117 and 125, and the step motors 177 and 125 start rotating in the opposite direction.

Disconnection of the step motors 117 and 125 is carried out as described above by a signal from the output 152 of the OR circuit 153 which resets the flip-flop 149 to 0.

The selector 16 (FIG. 13) performs the function of discriminating the first and the second addresses of the location of the instruction storage device 5 and the control and reversal codes out of the instruction fed from the output 22 (FIG. 1) of the instruction storage device 5, the first location address going to the output 17 of the instruction storage device 5, the second address to its output 18, and the control and reversal codes to the output 18.

When some bits of the binary number are applied to the inputs 155 (FIG. 13) of the decoder 154, the output electric signal appears at its bus 156 only. The bus 156 is connected by means of the diodes 157 to the outputs 19 which form an appropriate binary number of the reversal code.

(If the bus 156 is connected to one of the outputs 19, a corresponding bit of the reversal code contains 1).

The bus 156 is also connected with the aid of the diodes 158 to the remaining outputs 19 of the control code which form a binary number corresponding to the control code.

The signals from other bits of the instruction delivered from the output 22 (FIG. 1) of the instruction storage device to the input of the selector 16 are transmitted in this selector to its outputs 17 and 18 without any changes.

The input unit 1 (FIG. 14) converts the input signal fed to its inputs 2 into an input instruction to be delivered to the inputs 4 (FIG. 1) of the control unit 3.

The input signal of the input unit 1 (FIG. 14) is a signal produced by pushing one of the keys 159; as a result, an electric signal is sent to the input of the pulse shaper 162 and the pulse shaper generates an output pulse which goes to one of the inputs 4 (FIG. 1) of the control unit 3.

The output unit 23 (FIG. 15) serves for an exchange of instructions between the control unit 3 (FIG. 1), the functional converter 10, the instruction storage device 5, and the external device 25.

An electronic computer may be used as an external device.

The design of the matching elements 163 (FIG. 15) is mainly dictated by the type of the external device 25 (FIG. 1) and is determined by the functions of these matching elements 163 which are intended only to provide matching between the electric characteristics of the signals in the apparatus and in the external device 25.

The matching elements 163 may be, for example, amplifiers, gates, pulse shapers, etc.

The decoder 154 (FIG. 16) serves to convert the instruction in the form of a binary number into an output signal to be sent to one of the output buses 156.

Each output bus 156 is connected with the output of one of the AND circuits 167–170, and 172–175, each of them having three inputs. These inputs are connected with the outputs 179 and 180 of the flip-flop 164, with the outputs 177 and 178 of the flip-flop 165 and with the outputs 171 and 176 of the flip-flop 166 so that each binary number applied to the inputs 155 triggers on only one of the AND circuits 167–170 or 172–175 and a signal appears at its output and at the corresponding output bus 156.

Thus, if 1's are sent to the inputs of all the flip-flops 164, 165 and 166, only the AND circuit 175 starts to conduct and the signal is produced at the corresponding output bus 156 only.

For expanding the capabilities of the apparatus of the present invention, provisions are made for incorporating the apparatus of the invention into a computer-based teaching system to be used as an external console of the computer.

In this case, the teaching programme is compiled in such a way that it is mainly realized by the apparatus for presenting information of the present invention, and starts using the computer only when the functional capabilities of the apparatus make it inapplicable for the purpose.

Such a design makes it possible, first, to raise appreciably the reliability of the teaching system, because a failure of the computer will simply somewhat reduce the quality of the teaching process rather than cause stopping of the entire system, as all the devices for presenting information will operate off-line. Second, such a teaching system requires a computer of a much lower memory capacity and speed, because the bulk of the control information needed for the operation of the system is handled locally, while the computer processes only the information which cannot be handled by the apparatus of the present invention.

The apparatus for presenting information may be effectively used at libraries, educational establishments and for medical applications.

For this purpose, it is sufficient to replace in the apparatus the storage medium with a teaching programme by a storage medium with a diagnostic test or reference material.

The apparatus disclosed herein is applicable for handling complex problems that can normally be solved only by large teaching systems based on high-capacity computers.

The apparatus can be employed as a self-teaching aid, for example, for independent studies.

The apparatus for presenting information can be used in programmed teaching classes at schools, colleges and universities. In this case, the apparatuses are controlled from the teacher's console, and the results of the teaching process are recorded, for example, with the help of an electrical typewriter.

When used in conjunction with a small-capacity computer, the apparatuses may form an automatic programmed teaching system which is able to solve a wide range of methodological problems.

What is claimed is:

1. Apparatus for presenting information stored in the locations of a storage and display device with a set number of selection coordinates which selects said locations along at least one of said selection coordinates, comprising an input unit for receiving an input signal in the form of a binary number; a control unit connected to said input unit and intended for converting the binary code of the input instruction of said control unit into another binary number some bits of which form output instruction and the remaining bits making up a control instruction; an instruction storage device connected to said control unit; an input and an output of said instruction storage device; locations of said instruction storage device for storing instructions; each of said instructions being a binary number representing at least one address of said location with said instruction stored therein; the number of addresses of said location of said instruction storage device is equal to the number of said selection coordinates in said storage and display device; said instruction storage device which alternately selects said locations in an increasing order and connects said locations to said output of the instruction storage device as determined by said control instruction delivered from said control unit; each said location of said instruction storage device corresponds to said location of said storage device; a synchronizer connected to said instruction storage device and said storage device which synchronizes selection of said locations in said instruction storage device with selection of said locations of said storage device; a coincidence unit used to compare said output instruction storage device, with the address of one of said locations of said instruction storage device; upon coincidence of said addresses said coincidence unit generates a signal which goes to said instruction storage device and stops location selection therein; inputs and output of the coincidence unit; said first inputs of said coincidence unit are electrically connected to said control unit; said second inputs of said coincidence unit are electrically connected to said output of said instruction storage device, while said output of said coincidence unit is connected to said instruction storage device; each said location of said instruction storage device holds an instruction in the form of a binary number comprising at least one additional address of same said location; the number of said additional addresses is equal to the number of said selection coordinates in said storage device; said apparatus comprising also a selector intended for discriminating said addresses of each of said locations in said instruction storage device; inputs and outputs of said selector; said inputs of said selector are connected to said outputs of said instruction storage device; said addresses of each of said locations in said instruction storage device are delivered to appropriate said outputs of said selector; a switch which alternately connects said locations of said instruction device to said second inputs of said coincidence unit as determined by said control instruction delivered from said control unit; inputs, control inputs and outputs of the switch; said inputs of the switch are connected to appropriate said outputs of said selector; said control inputs of said switch are connected to said control unit; said outputs of the switch being connected to the coincidence unit; the sequence of selection of said locations in said instruction storage device is also determined by said control instruction fed from said control unit.

2. Apparatus for presenting information as defined in claim 1 wherein said location of said instruction storage device holds a binary number which contains a control code and a reversal code intended for converting said input instruction of said control unit and generating a control instruction of the control unit; said selector has at least one additional output connected to the control unit.

3. Apparatus for presenting information as defined in claim 1 in which said control unit has input buses and uses one AND circuit and a second AND circuit, and one second AND circuit and a third AND circuit, and one, a second, and a third OR circuits; inputs and outputs of said AND or OR circuits; said inputs of said AND circuits are interconnected; each of said input buses of said control unit associated with one bit of said input instruction of said control unit is connected to said first inputs of corresponding said AND circuits said second inputs of said AND circuits are connected to said other input buses of said control unit representing one bit of a control code and one bit of a reversal code; said output of said one AND circuit is connected to said input of said first OR circuit and with said input of said second OR circuit; said output of said second AND circuit is connected to said other input of said first OR circuit and to said input of said third OR circuit; the number of said first OR circuits and the number of said inputs of said second and third OR circuits are equal to the number of bits in the input instruction of said control unit; said outputs of said first OR circuits serve as output buses of said control unit; each of said output buses represents one bit of said output instruction of said control unit; said outputs of said second and third OR circuits act as control outputs of said control unit corresponding to bits of said control instruction of said control unit.

4. Apparatus for presenting information as defined in claim 2 in which said control unit uses one AND circuit and a second AND circuit, and one, a second and a third OR circuits; inputs and outputs of said AND and OR circuits; said inputs of said AND circuits are interconnected; each of said input buses of said control unit representing one bit of said input instruction of said control unit is connected to said interconnected first inputs of said corresponding AND circuits; said second inputs of said AND circuits are connected to other said buses of said control unit which represent one bit of a control code and one bit of a reversal code; said output of one AND circuit is connected to said input of said first OR circuit and with said input of said second OR circuit; said output of said second AND circuit is connected to said other input of said first OR circuit and with said input of said third OR circuit; the number of said first OR circuits and the number of said inputs of said second and third OR circuits are equal to the number of bits in the input instruction of said control unit; said outputs of said first OR circuits act as output buses of said control unit; each of said output buses represents one bit of said output instruction of said control unit; said outputs of said second and third OR circuits serve as control outputs of said control unit representing bits of said control instruction of said control unit. circuit;

5. Apparatus for presenting information as defined in claim 4, wherein said control unit comprises additional AND circuits the number of which is equal to the number of bits in said input instruction of said control unit; inputs and outputs of said additional AND circuits; said first input of each of said additional AND circuits is connected to said output of one said AND circuit; said second input of said additional AND circuit is connected to said output of said other AND circuits; said outputs of said additional AND circuits are interconnected and form an output of said control unit corresponding to an additional bit in said control instruction of said control unit.

6. Apparatus for presenting information as defined in claim 1 comprising: a function converter inputs and outputs of said function converter; said inputs of said function converter receiving said output instruction of said control unit; said function converter converting said output instruction into a code representing the address of one of said locations of said storage device; said outputs of said function coverter are connected to said first inputs of said coincidence unit; said inputs of said function converter are connected to said control unit.

7. Apparatus for presenting information as defined in claim 6 in which said function converter comprises a matrix converter; inputs and outputs of the matrix converter; said inputs of said matrix converter are connected to said control unit; said matrix converter serves for linear conversion of said input instruction fed from said control unit; apparatus comprises also an adder; inputs and outputs of the adder; said first inputs of said adder are connected to said outputs of said matrix converter; a delay unit connected to said outputs of said adder; said delay unit serves for storing the instruction delivered from said outputs of the adder; a second matrix converter; inputs and outputs of said second matrix converter; said inputs of said second matrix converter are connected to said outputs of said delay unit; said outputs of said second matrix converter are connected to said second inputs of said adder; said matrix converter is intended for linear conversion of said instruction stored in said delay unit; said outputs of said adder are connected to said first inputs of said coincidence unit.

8. Apparatus for presenting information as defined in claim 1 which comprises an output unit connected to an output device and said control unit, said output unit used for an exchange of instructions between said control unit and said external device.

9. Apparatus for presenting information as defined in claim 1 in which said output unit intended for an exchange of instructions between said external device and said instruction storage device, is connected to said instruction storage device.

10. Apparatus as defined in claim 8 in which said output unit serving for an exchange of instructions between said external device and said instruction storage device is connected to said instruction storage device.

11. Apparatus for presenting information as defined in claim 1 in which said output unit intended for an exchange of instructions between said function converter and said external device is connected to said function converter.

12. Apparatus as defined in claim 6 in which said output unit intended for an exchange of instructions between said function converter and said external device is connected to said function converter.

13. Apparatus as defined in claim 8 in which said output unit intended for an exchange of instructions between said function converter and said external device is connected to said function converter.

* * * * *